United States Patent [19]

Sze et al.

[11] 4,108,761

[45] Aug. 22, 1978

[54] DENITRIFICATION OF CARBONACEOUS FEEDSTOCKS

[75] Inventors: Morgan C. Sze, Upper Montclair; Abraham P. Gelbein, Plainfield; Joon T. Kwon, Freehold Township, Monmouth County, all of N.J.

[73] Assignee: The Lummus Company, Bloomfield, N.J.

[21] Appl. No.: 786,208

[22] Filed: Apr. 11, 1977

Related U.S. Application Data

[63] Continuation of Ser. No. 574,255, May 5, 1975, abandoned.

[51] Int. Cl.$^2$ ............................................. C10G 23/02
[52] U.S. Cl. ................................................ 208/254 H
[58] Field of Search ................................... 208/254 H

[56] References Cited

U.S. PATENT DOCUMENTS 3,369,999   2/1968   Donaldson et al. ............. 208/254 H

*Primary Examiner*—George Crasanakis
*Attorney, Agent, or Firm*—Marn & Jangarathis

[57] ABSTRACT

A carbonaceous feedstock, obtained from either a petroleum or coal source, is hydrodenitrified by the use of a supported sulfided catalyst containing nickel, molybdenum and iron, with the molybdenum being present in an amount of from about 10% to about 20%, by weight, calculated as $MoO_3$, based on total weight of catalyst, the iron to molybdenum atomic ratio being from about 0.05 to about 0.5, and the nickel to molybdenum atomic ratio being from about 0.2 to about 0.6.

The process effectively denitrifies high nitrogen content feeds.

12 Claims, No Drawings

DENITRIFICATION OF CARBONACEOUS FEEDSTOCKS

This is a continuation of application Ser. No. 574,255, filed May 5, 1975 and now abandoned.

This application relates to the treatment of carbonaceous feedstocks, and more particularly, to a new and improved process for the denitrification of a carbonaceous feedstock.

In many cases, it is highly desirable to remove nitrogen compounds from a carbonaceous feedstock, obtained from either petroleum or coal source. Thus, for example, in the case where the carbonaceous feedstock is to be employed as a fuel, it is required to reduce the nitrogen content thereof in order to reduce the emission of oxides of nitrogen. Also, in many cases where a carbonaceous feedstock is to be subsequently processed, the nitrogen content should be reduced in that the subsequent processing may require low nitrogen contents; for example, hydrocracking of distillates.

Denitrification is generally effected by the use of a supported sulfided catalyst containing nickel and molybdenum; however, for many feedstocks, the nickel-molybdenum catalyst is not effective for lowering the nitrogen content to the desired value. Accordingly, there is a need for a new and improved process for effective denitrification of carbonaceous feeds.

An object of the present invention is to provide for improved denitrification of carbonaceous feeds.

Another object of the present invention is to provide a process for effecting denitrification of feeds having a high nitrogen content.

These and other objects of the present invention should become more apparent from reading the following detailed description thereof.

In accordance with the present invention, there is provided a process for the hydrodenitrification of a nitrogen containing carbonaceous feedstock wherein the hydrodenitrification is effected in the presence of a supported sulfided catalyst containing nickel, molybdenum and iron, in amounts effective for hydrodenitrification. It has been found that by effecting denitrification in the presence of such a catalyst, nitrogen contents can be reduced to acceptable values, even when employing, feedstocks having high nitrogen contents.

More particularly, the denitrification is effected by contacting the feedstock with hydrogen in the presence of the catalyst at temperatures, pressures, hydrogen through-put, and space velocities which are effective for providing denitrification of the feedstock. The hydrodenitrification is generally effected at a temperature from about 500° F to about 850° F, preferably from about 650° F to 820° F. The hydrodenitrification is generally effected at pressures from about 1000 to 4000 psig, although with feedstocks containing low nitrogen contents, the pressures may be as low as 200 psig. As known in the art, higher pressures provide improved denitrification and, accordingly, with feedstocks having high nitrogen contents, higher pressures are generally employed.

The hydrogen through-put rate is generally maintained above about 500 S.C.F. per barrel of feed, and is preferably in the order of from about 1000 to 10,000 S.C.F. per barrel. The hydrogen is provided in an amount to supply that consumed in the conversion of the nitrogen compound and to compensate for any hydrogenation of other components of the feedstock. The flow of feedstock relative to the catalyst will generally be in the order of from about 0.2–10 L.H.S.V. In treating the higher boiling materials, the space velocity is generally maintained at the lower values.

The contacting of hydrogen, liquid carbonaceous feedstock and catalyst may be effected in any one of the wide variety of ways known in the art, including a fixed bed, fluidized bed, expanded bed, etc. The contacting may be effected in one or more reactors, employed in parallel and/or series, employing upflow, downflow, concurrent or countercurrent hydrogen flow. The choice of the optimum procedure for effecting contact of the hydrogen, feedstock and catalyst is deemed to be within the scope of those skilled in the art from the teachings herein.

The present invention is particularly applicable to treating feedstocks having a high nitrogen content; that is, a nitrogen content of at least 0.5 wt. %, generally in the order of 0.5 wt. % to 2 wt. %, in that the catalysts heretofore used in the art were not effective for effecting denitrification of such feeds. As should be apparent, however, the process of the present invention can also be employed for treating feedstocks having low nitrogen contents; that is, nitrogen contents of less than 0.5 wt %, and generally in the order of 0.01% to 0.3%, by weight.

As representative examples of feedstocks having high nitrogen contents; i.e., nitrogen content of at least 0.5 wt. %, which can be treated in accordance with the present invention, there may be mentioned: solvent extracted coal, coal solutions obtained by the hydroliquefaction of coal, coal tar distillate oils, shale oil, tar sands, heavy crude oils; e.g., Boscan crude oil, etc.

The process of the present invention is capable of providing denitrification in an amount of at least 50%, and generally in the order of 70% to 90%. As a result, the denitrification products derived from such feeds have a nitrogen content of less than 0.3%, and generally in the order of 0.1 to 0.25%, all by weight.

In the production of liquid products from coal, the denitrification can be conveniently effected as a part of the hydroliquefaction process. In particular, the coal is hydroliquefied in a suitable pasting solvent employing a catalyst as hereinabove described. It is to be understood, however, that liquid feedstocks produced from coal can be subjected to hydrodenitrification in accordance with the present invention, other than as part of the coal liquefaction step.

As representative examples of feedstocks with low nitrogen contents, i.e., less than 0.5 wt. %, generally less than 0.4 wt. %, which may also be treated in accordance with the present invention, although the present invention is particularly applicable to those feedstocks having high nitrogen contents, there may be mentioned: vacuum gas oils, gas oils, naphthas, etc. In general, by proceeding in accordance with the present invention, the nitrogen contents can be reduced to less than 50 ppm, and with very low nitrogen feedstocks, the nitrogen content can be reduced to less than 1 ppm. The process as applied to low nitrogen feeds, has particular applicability for treating distillate feedstocks, which are to be subjected to a hydrocracking process, in that the nitrogen content of the feed may adversely affect the ability to provide for effective hydrocracking.

The catalyst which is employed for the hydrodenitrification is a supported sulfided catalyst containing molybdenum, nickel and iron, with the molybdenum being present in an amount from about 10% to about 20%, preferably from about 13% to about 17%, all by weight, calculated as MoO₃, based on total catalyst weight, the iron being present in an iron to molybdenum atomic ratio from about 0.05 to about 0.5, preferably from about 0.1 to about 0.3, and the nickel being present in a nickel to molybdenum atomic ratio of from about 0.2 to about 0.6, and preferably from about 0.3 to about 0.5.

The support for the catalyst may be any one of a wide variety of porous supports generally employed for hydrodenitrification catalysts. As representative examples of such supports, there may be mentioned: alumina; in particular, activated aluminas, such as, beta-, gamma- and eta-alumina; silica-alumina, silica, molecular sieves, silica stabilized alumina; i.e., less than 6% silica. The best results are obtained with the alumina or silica stabilized alumina supports.

The nickel, molybdenum and iron may be supported on the catalyst support by any one of a wide variety of procedures known in the art, such as, impregnation and co-precipitation. The components of the catalyst may be supported on the catalyst in any order; however, in general, it is preferred to first support the molybdenum, followed by adding of the iron and nickel, either together or separately. In using an impregnation technique, the impregnation may be effected, as known in the art, from either organic or aqueous solutions. The techniques for providing supported catalysts are known in the art, and accordingly, no further details in this respect are deemed necessary for a full understanding of the invention.

Subsequent to supporting the iron, nickel and molybdenum on the support, the catalyst is calcined to convert the components to their oxides. In general, the calcination is effected at a temperature of from about 400° F to about 900° F, for a time sufficient to convert the compounds to their oxides. The calcination of catalysts is known in the art and, accordingly, no detailed description thereof is deemed necessary for a full understanding of the present invention.

As hereinabove noted, the catalyst is employed in the form of a sulfide, and the catalyst may be sulfided either prior to use thereof, or in situ, in the case where the feedstock includes sulfur. The sulfiding may be effected, prior to use of the catalyst, by passing over the catalyst a sulfiding agent such as hydrogen sulfide, carbon disulfide, mercaptans, disulfides, and the like. The sulfiding of catalyst is well known in the art and, accordingly, no further description of such a procedure is deemed necessary for understanding the present invention.

The present invention will be described with reference to the following examples; however, it is to be understood that the scope of the invention is not to be limited thereby.

EXAMPLE 1

A typical well known nickel molybdate on alumina catalyst was selected as a standard. This was the best denitrification catalyst available until now. It contained 3.5 weight percent of NiO and 15 weight percent of MoO₃. The surface area and pore volume were 150 sq.m./gm. and 0.6 cc/gm respectively. Before the catalyst was used, it was sulfided by passing a stream of hydrogen containing 10 mol % H₂S at 550° to 600° F over a period of two hours. This catalyst is designated as catalyst "A".

EXAMPLE 2

The nickel molybdate catalyst described in Example 1 was selected as a catalyst base. It was further processed as follows:

(1) Dissolve 2.64 gms. of ferric chloride in 140 cc of acetone.

(2) Add 10–20 cc portion of the acetone solution of FeCl₃ to 130 gms. of the nickel molybdate catalyst with shaking. When excess liquid appears at the bottom of the flask, the impregnation is considered complete.

(3) Steam the catalyst for one hour and then dry by passing nitrogen gas over the catalyst at 400° F.

(4) Before the catalyst is used, sulfide it in accordance with the same procedure as given in Example 1.

This catalyst is designated as catalyst "B".

EXAMPLE 3

A coal tar distillate oil with a density of 1.17 gms/cc. and boiling within the range of 550° F and 900° F was hydrogenated over catalyst "A" and "B". This feedstock contained 1.1 wt. % of combined nitrogen and 0.5 wt. % of combined sulfur. The results of the hydrogenation were as follows:

| Catalyst | "A" | "B" |
|---|---|---|
| Liquid hourly space velocity, HR⁻¹ | 1.30 | 0.95 |
| Temperature, ° F | 750 | 750 |
| Pressure, psig | 2000 | 2000 |
| Product quality: | | |
| Nitrogen, wt.% | 0.5 | 0.1 |
| Sulfur, wt.% | 0.2 | 0.1 |

EXAMPLE 4

A bituminous coal with the following analysis was selected for processing:

| Proximate Analysis | |
|---|---|
| % Moisture | 0.30 |
| Volatile Matter (DB), wt.% | 38.12 |
| Ash Content (DB), wt.% | 23.17 |
| Fixed Carbon (DB), wt.% | 38.71 |
| Ultimate Analysis | |
| Carbon Content, wt.% | 64.96 |
| Hydrogen Content, wt.% | 4.96 |
| Nitrogen Content, wt.% | 1.00 |
| Sulfur Content (Total), wt.% | 2.04 |
| Water Content, wt.% | 0.30 |
| Mineral Matter, wt.% (Sulfur Free) | 22.64 |
| Organic Oxygen Content, wt.% (via. difference) | 4.10 |

This coal was pulverized and blended with a pasting oil to form a slurry containing 35 wt. percent coal. As pasting oil, the coal tar distillate described in Example 3 was used. The slurry had nitrogen and sulfur contents of 1.07 and 1.04 weight percent respectively. This slurry was then hydrogenated under the following conditions:

| Catalyst | "B" |
|---|---|
| Liquid hourly space velocity, HR⁻¹ | 0.9 |
| Temperature, ° F | 775 |
| Pressure, psig | 2000 |
| Product: Nitrogen, wt.% | 0.25 |
| Sulfur, wt.% | 0.24 |
| Denitrification | 77% |

EXAMPLE 5

Catalyst "B" was tested with a high nitrogen heavy crude oil. As feedstock, the Boscan crude from Venezuela was selected. The crude oil had a nitrogen and a sulfur content of 0.6 and 5.5 wt. percent respectively. This oil was tested under the following conditions and high denitrification was effected:

| Catalyst | "B" |
| --- | --- |
| Liquid hourly space velocity, $HR^{-1}$ | 0.90 |
| Temperature, °F | 775 |
| Pressure, psig | 2000 |
| Product: Nitrogen, wt.% | 0.1 |
| Sulfur, wt.% | 0.5 |

The present invention is particularly advantageous in that by proceeding in accordance with the present invention, carbonaceous feeds, derived from both petroleum and coal sources, having high nitrogen contents can be effectively denitrified. The catalysts which were generally employed for said denitrification were comprised of only nickel and molybdenum, and such catalysts were not effective for denitrification of feedstocks having high nitrogen contents.

Although it is known in the art to employ a molybdenum catalyst in combination with two iron group metals, including nickel, iron and cobalt for the hydrodesulfurization of hydrocarbon oils, as disclosed in U.S. Pat. No. 2,880,171 there is no suggestion in the patent that such catalysts, and in particular, a molybdenum-iron-nickel catalyst could be employed for effective denitrification of nitrogen containing feedstocks.

Numerous modifications and variations of the present invention are possible in light of the above teachings and, therefore, within the scope of the appended claims, the invention may be practiced otherwise than as particularly described.

What is claimed is:

1. A process for hydrodenitrification of a nitrogen-containing carbonaceous feedstock having a nitrogen content of at least 0.5 weight % comprising:
    effecting hydrodenitrification in the presence of a supported sulfided catalyst containing nickel, molybdenum and iron wherein the molybdenum is present in an amount from about 10% to about 20%, by weight, calculated as $MoO_3$, based on total weight of catalyst, the iron to molybdenum atomic ratio being from about 0.05 to about 0.5 and the nickel to molybdenum atomic ratio being from about 0.3 to about 0.5.

2. The process of claim 1 wherein the carbonaceous feedstock is derived from petroleum.

3. The process of claim 1 wherein the carbonaceous feedstock is derived from coal.

4. The process of claim 1 wherein the support is activated alumina.

5. The process of claim 1 wherein the support is silica-alumina.

6. The process of claim 1 wherein the support is silica stabilized activated alumina.

7. The process of claim 1 wherein the hydrodenitrification is effected at a temperature from about 500° F to about 850° F to effect at least 50% denitrification of the feedstock.

8. A process for the hydrodenitrification of a nitrogen containing carbonaceous feedstock having a nitrogen content of at least 0.5 weight %, comprising:
    effecting hydrodenitrification in the presence of a suported sulfided catalyst containing nickel, molybdenum and iron wherein the molybdenum is present in an amount from about 13% to 17%, by weight, calculated as $MoO_3$, based on total catalyst weight and the iron to molybdenum atomic ratio is from about 0.1 to about 0.3 and the nickel to molybdenum atomic ratio is from about 0.3 to about 0.5, said hydrodenitrification being effected at a temperature of from about 500° F to about 850° F and at a pressure of from about 1,000 to about 4,000 psig.

9. The process of claim 8 wherein the support is selected from the group consisting of activated aluminas, silica-alumina and silica stabilized alumina.

10. The process of claim 9 wherein the carbonaceous feedstock is derived from coal.

11. The process of claim 9 wherein the carbonaceous feedstock is derived from petroleum.

12. The process of claim 1 wherein the molybdenum is present in an amount from about 13% to 17%, by weight, calculated as $MoO_3$, based on total catalyst weight and the iron to molybdenum atomic ratio is from about 0.1 to about 0.3.

* * * * *